US012627533B2

(12) United States Patent
Portnik et al.

(10) Patent No.: US 12,627,533 B2
(45) Date of Patent: May 12, 2026

(54) DEMODULATION REFERENCE SIGNAL BASED CHANNEL ESTIMATION FOR ADJUSTING OR STOPPING RETRANSMISSION

(71) Applicant: Dell Products L.P., Round Rock, TX (US)

(72) Inventors: Ilya Portnik, Ashton (CA); Eran Goldstein, Montreal (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 340 days.

(21) Appl. No.: 18/185,769

(22) Filed: Mar. 17, 2023

(65) Prior Publication Data

US 2024/0313999 A1 Sep. 19, 2024

(51) Int. Cl.
*H04L 25/02* (2006.01)
*H04B 17/309* (2015.01)
*H04L 1/1812* (2023.01)

(52) U.S. Cl.
CPC ....... *H04L 25/0224* (2013.01); *H04B 17/309* (2015.01); *H04L 1/1812* (2013.01)

(58) Field of Classification Search
CPC .. H04L 25/0224; H04L 1/1812; H04B 17/309
See application file for complete search history.

(56) References Cited

U.S. PATENT DOCUMENTS

| | | | |
|---|---|---|---|
| 8,396,156 B2 | 3/2013 | Obuchi et al. |
| 9,521,579 B1 | 12/2016 | Mudulodu |
| 10,111,224 B2 | 10/2018 | Lee et al. |
| 11,375,549 B2 | 6/2022 | Lei et al. |
| 12,003,434 B2 | 6/2024 | Frenne et al. |
| 2019/0207705 A1 | 7/2019 | Zhou et al. |

(Continued)

FOREIGN PATENT DOCUMENTS

WO 2021196025 A1 10/2021

OTHER PUBLICATIONS

3GPP "5G; NR; Physical channels and modulation (3GPP TS 38.211 version 16.7.0 Release 16)" Oct. 2021, https://www.etsi.org/deliver/, 138 pages.

(Continued)

*Primary Examiner* — Natasha W Cosme
(74) *Attorney, Agent, or Firm* — Amin, Turocy & Watson, LLP

(57) ABSTRACT

Demodulation reference signal (DMRS) based channel estimation, e.g., for adjusting and/or stopping retransmissions, is described herein. A method as described herein can include receiving, by a device comprising a processor, a first transmission that is transmitted to the device by network equipment via a downlink channel, wherein the first transmission comprises a DMRS; estimating, by the device, a channel quality associated with the downlink channel based on the DMRS, resulting in an estimated channel quality; and transmitting, by the device to the network equipment via an uplink channel, a second transmission, the second transmission comprising channel quality data indicative of the estimated channel quality and hybrid automatic repeat request data corresponding to the first transmission.

20 Claims, 11 Drawing Sheets

100

(56) References Cited

U.S. PATENT DOCUMENTS

| | | | |
|---|---|---|---|
| 2020/0007247 A1 | 1/2020 | Gulati et al. | |
| 2020/0228290 A1 | 7/2020 | Baghel et al. | |
| 2022/0070711 A1* | 3/2022 | Elshafie | H04W 24/10 |
| 2022/0329301 A1 | 10/2022 | Shin et al. | |
| 2023/0045947 A1* | 2/2023 | Elshafie | H04L 1/0003 |
| 2023/0179326 A1 | 6/2023 | Li | |
| 2023/0397219 A1 | 12/2023 | Papasakellariou | |
| 2023/0413290 A1* | 12/2023 | Hou | H04L 5/001 |

OTHER PUBLICATIONS

International Search Report and Written Opinion for International Application No. PCT/US2023/036163 dated Feb. 1, 2024.
International Search Report and Written Opinion for International Application No. PCT/US2023/036164 dated Feb. 12, 2024.
Huawei et al.: "CSI feedback enhancements", 3GPP Draft; RI-2007566, 3rd Generation Partnership Project (3GPP), Mobile Competence Centre ; 650, Route Des Lucioles ; F-06921 Sophia Antipolis Cedex ; France, vol. RAN WGI, No. E-meeting; Oct. 26, 2020-Nov. 13, 2020 Nov. 1, 2020 (Nov. 1, 2020), XP052348920, Retrieved from the Internet: URL:https://ftp.3gpp.org/tsg_ran/WG1_RL1/T SGR1_103-e/Docs RI-2007566.zip RI-2007566.docx.
Non-Final Office Action received for U.S. Appl. No. 18/185,836 dated Jul. 2, 2025, 23 pages.
Final Office Action received for U.S. Appl. No. 18/185,836 dated Sep. 22, 2025, 38 pages.
Notice of Allowance received for U.S. Appl. No. 18/185,836 dated Feb. 19, 2026, 15 pages.
ETSI TS 138 214 V15.4.0, "5G; NR; Physical Layer Procedures for Data (3GPP TS 38.214 Version 15.4.0 Release 15)", Technical Specification, Apr. 2019, 104 pages.
Larsson Daniel Chen, "NR Physical Layer Overview", 5G and Beyond, Chapter 9, 2021, pp. 259-301.

* cited by examiner

100

400

500

600

| | | Time |
|---|---|---|
| Node B 10 | UE 20 | |
| Transmission: Data1 + DMRS → | | 602 |
| ← ACK + channel condition | | 604 |
| Transmission: Data2 (+ DMRS) → | | 606 |

700

| | | Time |
|---|---|---|
| Node B 10 | UE 20 | |
| Transmission: Data1 + DMRS → | | 702 |
| ← NACK + channel condition | | 704 |
| Retransmission: Data1 (+ DMRS) → | | 706 |

900

SNR report

Receiver component
220

Channel evaluation
component 810

Parameter adjustment
component 230

Scheduling
component 910

Transmitter
component 210

1100

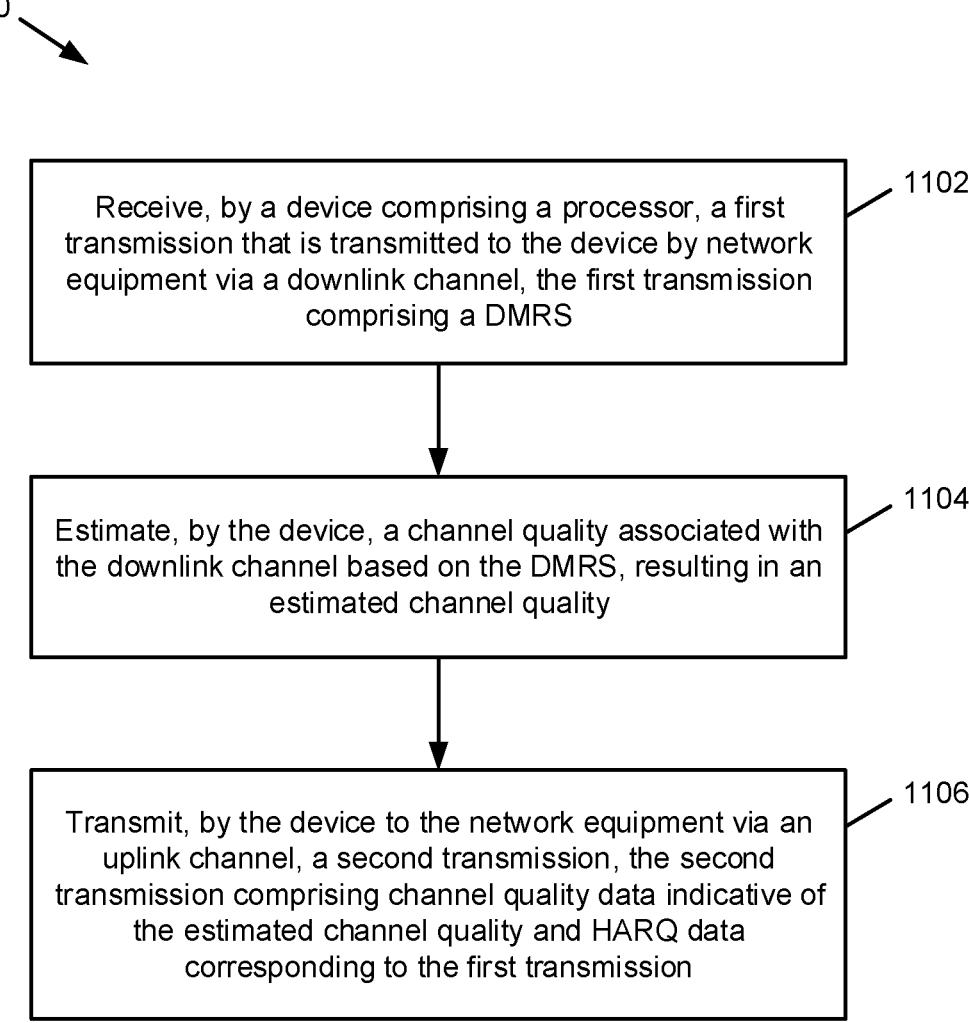

1102

Receive, by a device comprising a processor, a first transmission that is transmitted to the device by network equipment via a downlink channel, the first transmission comprising a DMRS

1104

Estimate, by the device, a channel quality associated with the downlink channel based on the DMRS, resulting in an estimated channel quality

1106

Transmit, by the device to the network equipment via an uplink channel, a second transmission, the second transmission comprising channel quality data indicative of the estimated channel quality and HARQ data corresponding to the first transmission

FIG. 11

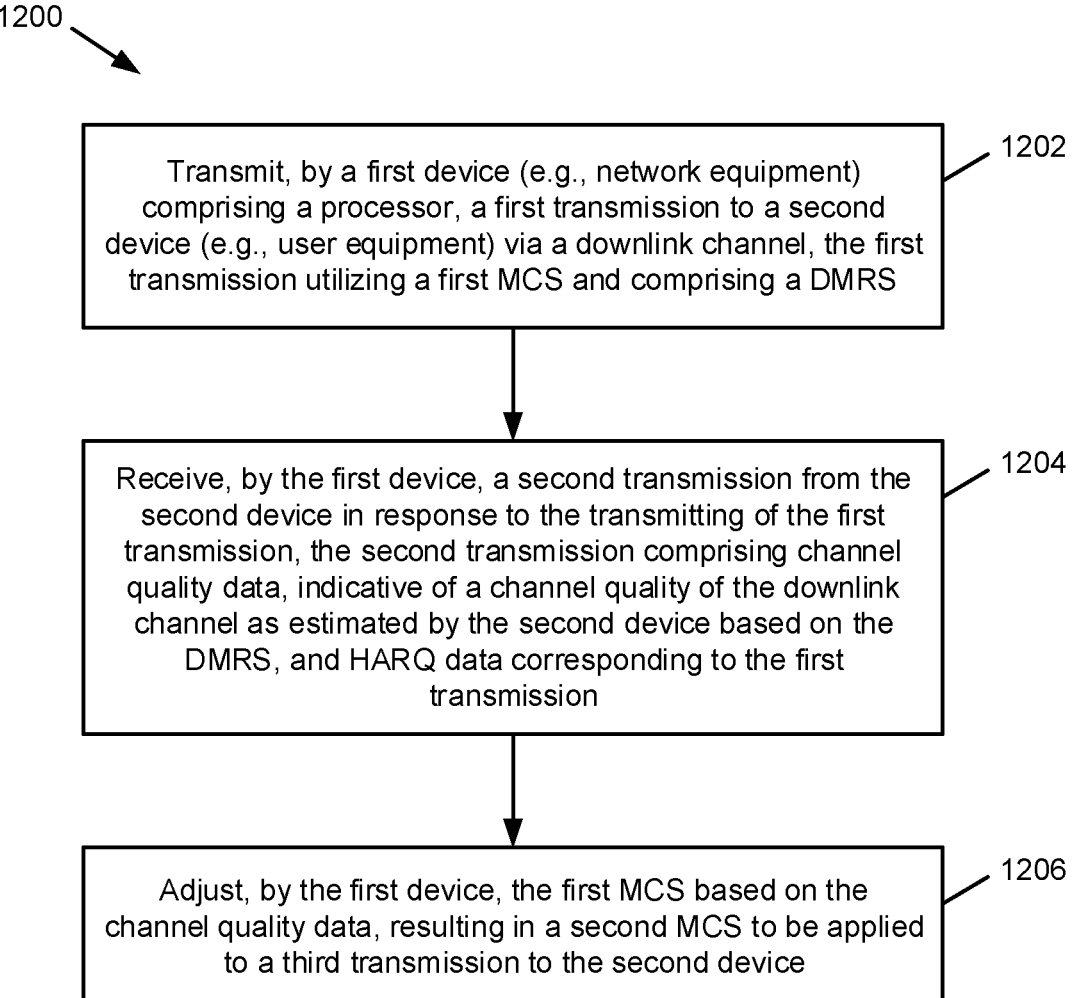

1200

Transmit, by a first device (e.g., network equipment) comprising a processor, a first transmission to a second device (e.g., user equipment) via a downlink channel, the first transmission utilizing a first MCS and comprising a DMRS — 1202

Receive, by the first device, a second transmission from the second device in response to the transmitting of the first transmission, the second transmission comprising channel quality data, indicative of a channel quality of the downlink channel as estimated by the second device based on the DMRS, and HARQ data corresponding to the first transmission — 1204

Adjust, by the first device, the first MCS based on the channel quality data, resulting in a second MCS to be applied to a third transmission to the second device — 1206

FIG. 12

DEMODULATION REFERENCE SIGNAL BASED CHANNEL ESTIMATION FOR ADJUSTING OR STOPPING RETRANSMISSION

BACKGROUND

In a wireless communication network, such as a Fifth Generation (5G) New Radio (NR) network, a user equipment (UE) can initiate access by decoding a Synchronization Signal Block (SBB), which contains basic information to enable the UE to proceed with System Information Block (SIB) decoding followed by a Physical Random Access Channel (PRACH) transmission and attach procedure to attach the UE to the network. Once the attach is completed, channel condition information can be used to identify proper parameters, such as a modulation and coding scheme (MCS), rank indicator (RI), and precoding matrix indicator (PMI) for effective data traffic. For instance, based on the channel condition, a base station scheduler can select resource blocks and transmission parameters for a UE (e.g., MCS, RI, and PMI), which can then be used by a corresponding gNode B (gNB) to initiate data traffic.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a user equipment is described herein. The user equipment can include a memory that stores executable components and a processor that executes the executable components stored in the memory. The executable components can include a receiver component that receives a first transmission, transmitted by network equipment to the user equipment via a downlink communication channel, the first transmission including a demodulation reference signal (DMRS). The executable components can also include a channel estimation component that estimates a condition of the downlink communication channel based on the DMRS, resulting in an estimated channel condition. The executable components can further include a channel reporting component that transmits a second transmission to the network equipment via an uplink communication channel, the second transmission including channel condition data indicative of the estimated channel condition and a hybrid automatic repeat request (HARQ) indicator corresponding to the first transmission.

In another implementation, a method is described herein. The method can include receiving, by a device including a processor, a first transmission that is transmitted to the device by network equipment via a downlink channel, where the first transmission comprises a DMRS. The method can additionally include estimating, by the device, a channel quality associated with the downlink channel based on the DMRS, resulting in an estimated channel quality. Further, the method can include transmitting, by the device to the network equipment via an uplink channel, a second transmission, the second transmission including channel quality data indicative of the estimated channel quality and hybrid automatic repeat request data corresponding to the first transmission.

In an additional implementation, a non-transitory machine-readable medium including computer executable instructions is described herein. The instructions, when executed by a processor of a mobile device, can facilitate performance of operations including receiving a first transmission from a Node B via a physical downlink shared channel, the first transmission including a DMRS; estimating a channel condition associated with the physical downlink shared channel based on the DMRS, resulting in an estimated channel condition; and transmitting, to the Node B via a physical uplink channel, a second transmission, wherein the second transmission includes channel condition data associated with the estimated channel condition and an acknowledgement/negative acknowledgement indicator corresponding to the first transmission.

DESCRIPTION OF DRAWINGS

Various non-limiting embodiments of the subject disclosure are described with reference to the following figures, wherein like reference numerals refer to like parts throughout unless otherwise specified.

FIG. 11 is a flow diagram of a method that facilitates DMRS-based channel estimation, e.g., for adjusting or stopping retransmission, in accordance with various implementations described herein.

FIG. 12 is a flow diagram of a method that facilitates DMRS-based modulation and coding scheme (MCS) determination in downlink allocation in accordance with various implementations described herein.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various embodiments provided herein are discussed with reference to specific communication network types and/or technologies, such as a Fifth Generation (5G) New Radio (NR) network. However, it is noted that references to these specific network technologies are made solely for purposes of providing example network environments in which the embodiments described herein can operate. Unless explicitly stated otherwise, the below description and the claimed subject matter are not intended to be limited to any particular networking environment or technology.

Figure 1:
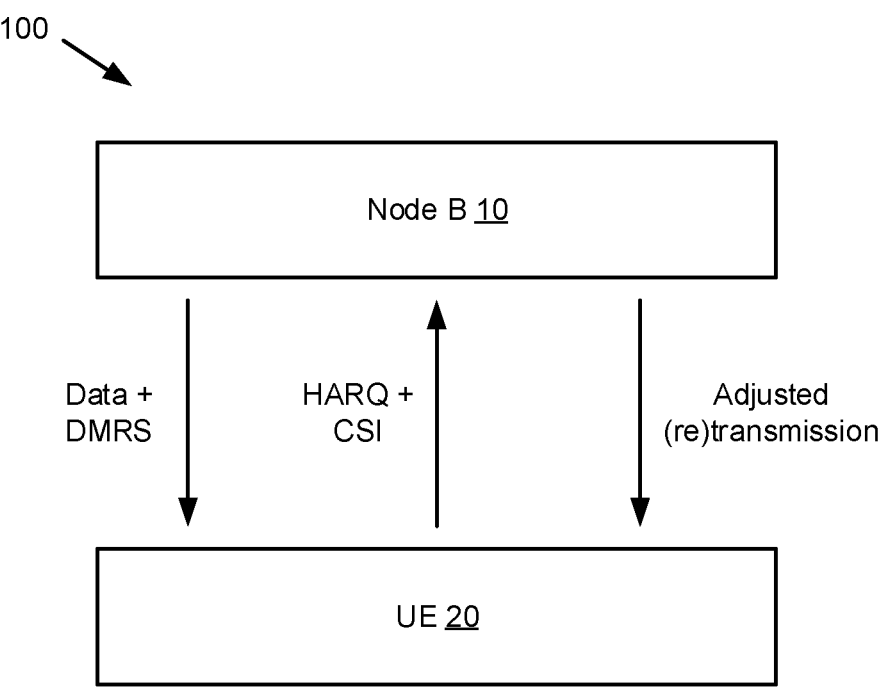
FIG. 1 is a block diagram of a system that facilitates DMRS-based channel estimation and transmission adjustment in a communication system in accordance with various implementations described herein.

With reference now to the drawings, FIG. 1 illustrates a block diagram of a system 100 that facilitates demodulation reference signal (DMRS)-based channel estimation and transmission adjustment in a communication system. System 100 as shown in FIG. 1 includes a Node B 10, which can engage in communication with a user equipment (UE) 20 via one or more uplink and/or downlink channels. An uplink channel refers to a communication link or channel from the UE 20 to the Node B 10, while a downlink channel refers to a communication link or channel from the Node B 10 to the UE 20.

In various implementations, the Node B 10 and UE 20 can communicate with each other, and/or with devices or network equipment not shown in system 100, via any suitable radio access technology or combination of technologies. By way of example, the Node B 10 and UE 20 can operate as part of a cellular communication network based on standards established by the Third Generation Partnership Project (3GPP), such as the Fourth Generation (4G) Long Term Evolution (LTE) standard, the Fifth Generation (5G) New Radio (NR) standard, and/or other suitable communication standards. Additionally, the Node B 10 and UE can also be capable of communication via one or more other suitable wired or wireless communication protocols, such as Wi-Fi, Bluetooth, etc., in addition to engaging in cellular communications. To the extent that specific standards, signals, or the like are referenced herein, it is noted that references to these standards, signals, etc., are intended merely by way of example and that similar concepts could be applied to other signals, technologies, etc., where appropriate without departing from the scope of this disclosure.

The Node B 10 shown in system 100 can provide communication service for respective devices within a communication range of the Node B 10, such as the UE 20. In a cellular communication network, an area in which the Node B 10 can provide communication service, and/or the Node B 10 itself, can be referred to as a cell. By way of example, the Node B 10 can provide connectivity between the UE 20 and respective data networks or internetworks, e.g., an Internet Protocol (IP) or other data network maintained by a network operator, the Internet, or the like, via a backhaul or other connection from the Node B 10 to core network elements or other network equipment, not shown in FIG. 1, that manage the respective data networks and/or internetworks. Additionally, depending on the network types and/or technologies used, the Node B 10 can also be referred to as a base station, an access point, an Evolved Node B (CNB), a Next Generation Node B (gNB), etc.

The UE 20 shown in system 100 can be any device that is capable of network communication with the Node B 10. By way of example, the UE 20 can be a mobile device, such as a smartphone, a tablet or notebook computer, a wearable device such as a smart watch, or the like, and/or a fixed device such as a desktop computer. Also or alternatively, the UE 20 can be a device such as a hotspot or network adapter that provides communication service for another device.

In an implementation in which the Node B 10 and UE 20 operate as part of a cellular communication network, the UE 20, upon being located within the coverage area of the Node B 10, can access the communication network by initiating an attach procedure with the Node B 10. For instance, as noted above, the UE 20 can start initial access by decoding a System Synchronization Block (SSB), which contains and/or is associated with a Primary Synchronization Signal (PSS), Secondary Synchronization Signal (SSS), and a Physical Broadcast Channel (PBCH). The SSB can provide the UE 20 with master information, such as basic information about the communication system. Based on this information, the UE 20 can proceed with decoding a System Information Block (SIB) followed by a Physical Random Access Channel (PRACH) transmission and attach procedure to successfully attach the UE 20 to the network.

During the attach procedure, the network (e.g., via the Node B 10) can operate with a low modulation and coding scheme (MCS) to ensure that data traffic associated with the UE 20 is conveyed properly to establish a connection without any retransmission to the network. In the event of data failures, the UE 20 can start the establishment from a Random Access Channel (RACH) procedure until reaching a maximum number of attempts, after which time the UE 20 can scan for another cell. Once the attach is completed, the data traffic to the system can rely on the channel condition, which can be measured by the UE 20 using a Channel State Information Reference Signal (CSI-RS) configured by the Node B 10. This information can be used to identify parameters such as MCS, rank, and precoding matrix indicator (PMI) for effective data traffic. Based on the channel condition, the base station scheduler associated with the Node B 10 can select resource blocks (RBs) and transmission parameters for the UE 20, such as MCS, RI, and/or PMI. The Node B 10 can then initiate data traffic using the identified parameters. In this way, the Node B 10 and UE 20 can operate as a closed loop system where the parameters for downlink communication conducted by the Node B 10 are based on measurements provided by the UE 20.

However, a CSI-RS approach as described above has various disadvantages that can reduce the quality of communication between the Node B 10 and the UE 20. For instance, CSI-RS is not configured on every slot, and if data fails on one of these slots the Node B 10 will retransmit the data with a different redundancy version (RV) index without having knowledge regarding the cause of the failure. The most common problem in this case is that the channel condition is not suitable with the configured parameters for the receiver to decode the signal in the first attempt. Additionally, in an implementation in which the CSI-RS is repeated on a periodic basis and the UE 20 is configured to report the channel condition on a periodic basis, the channel condition may not be available to the Node B 10 to determine the cause of the failure that is currently observed.

Techniques for CSI-RS based channel reporting and scheduling can also or alternatively experience other disadvantages. For instance, in the event that a radio frequency (RF) channel changes faster than the periodicity of the CSI-RS transmission, it is possible for UE reporting based on the CSI-RS to be outdated. Further, while CSI-RS is a resource that is transmitted with a configurable periodicity, CSI-RS is transmitted using downlink channel bandwidth that could otherwise be used for data purposes. As a result, increasing the periodicity or frequency resolution of the CSI-RS can lead to reduced bandwidth available for data.

Similarly, while aperiodic CSI-RS reports can be triggered to increase the number of CSI-RS reports from the UE 20, these aperiodic reports lead to a similar reduction in overall system throughput.

In view of at least the above, system 100 can facilitate estimation of channel condition at the UE 20 based on a demodulation reference signal (DMRS) transmitted by the Node B 10, e.g., with a data transmission on a Physical Downlink Shared Channel (PDSCH) or other downlink communication channel in the manner shown in FIG. 1. As further shown in FIG. 1, the UE 20 can transmit data relating to the channel condition, such as a signal to noise ratio (SNR) or other CSI properties, back to the Node B 10 along with hybrid automatic repeat request (HARQ) bit information, e.g., an acknowledgement (ACK)/negative acknowledgement (NACK) indicator, via an uplink channel. As additionally shown by FIG. 1, this channel condition information can then be used by the Node B 10 to help select an MCS and/or other properties to be used for a subsequent UE downlink allocation in order to improve performance. Since the UE 20 can transmit ACK/NACK information in this manner along with other data, such as data associated with a Physical Uplink Control Channel (PUCCH) or Physical Uplink Shared Channel (PUSCH), the UE 20 can combine the channel information on the same resources. Example transmission schemes that can be used for a control channel (e.g., PUCCH) transmission and a data channel (e.g., PUSCH) transmission are described in further detail below.

In an implementation, system 100 can leverage a DMRS signal, which is transmitted over the number of resource blocks that is allocated to the UE 20, to enable the UE 20 to report the channel condition, e.g., the SNR level that it observes over the channel, back to the Node B 10. In the event of a failure (e.g., in which the UE 20 reports a NACK), the Node B 10 can use the reported information to better understand the cause of the failure and make decisions regarding conducting a retransmission with a different MCS, adding additional resource blocks to accommodate the different MCS to make the retransmission transport block size aligned with the original transmission, stopping the retransmission and triggering a higher layer to transmit the data again with a new set of resources, and/or performing other suitable actions. Alternatively, in the event of a successful transmission (e.g., in which the UE reports an ACK), the Node B 10 can use the reported information to adjust subsequent transmissions to the UE 20. These operations as performed by the Node B are described in further detail below with regard to FIGS. 8-10.

Figure 2:
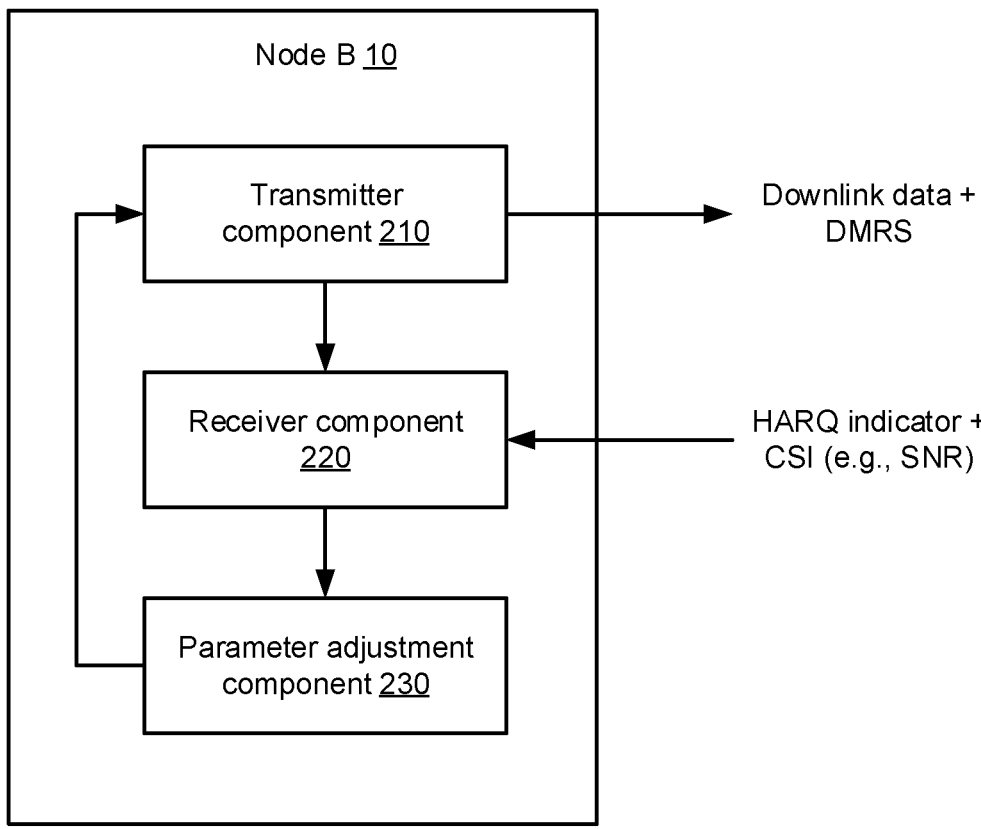
FIG. 2 is a block diagram depicting an example implementation of the Node B shown in FIG. 1.
Figure 3:
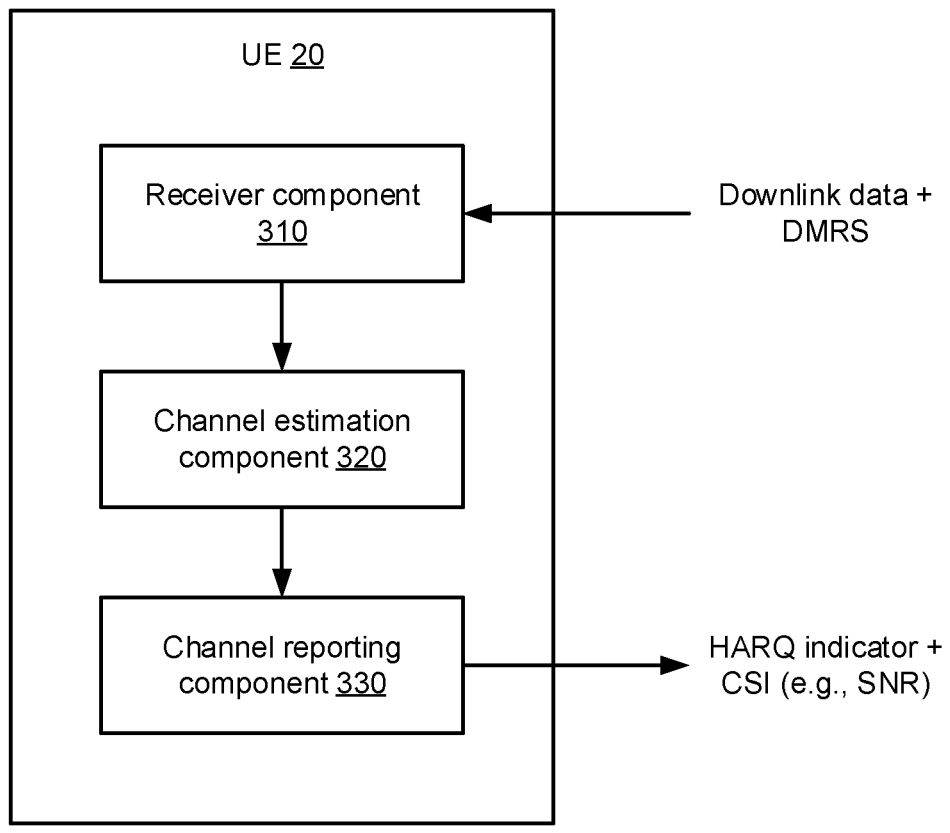
FIG. 3 is a block diagram depicting an example implementation of the user equipment (UE) shown in FIG. 1.

Example techniques that can be utilized by the Node B 10 for adjusting an MCS or other properties based on channel condition feedback from the UE 20 are described in further detail below with respect to FIG. 2. Additionally, example techniques that can be utilized by the UE 20 for measuring channel condition based on a DMRS and sending feedback as part of HARQ data are described in further detail below with respect to FIG. 3. Various functions that can be performed by the Node B 10 and the UE 20 are illustrated in FIG. 2 and FIG. 3, respectively, as logical components. In an implementation, the logical components shown in FIGS. 2-3, as well as in subsequent drawings, can be implemented in hardware, software, or a combination of hardware and software. By way of example, the illustrated components can be implemented as computer-executable components, e.g., components stored on a memory and executed by a processor. An example of a computer architecture including a processor and a memory that can be used to implement the various components presented herein is shown and described in further detail below with respect to FIG. 13.

Turning now to FIG. 2, an example implementation of the Node B 10 of system 100 is illustrated. The Node B 10 as shown in FIG. 2 includes a transmitter component 210 that can conduct a first transmission to a UE 20, e.g., as described above with respect to FIG. 1, via a downlink communication channel. By way of example in which the Node B 10 is a gNB operating in a 5G NR network, the downlink communication channel can be a PDSCH. Other downlink channels and/or network configurations could also be used. As further shown in FIG. 2, the first transmission conducted by the transmitter component 210 can include a DMRS, e.g., to enable the UE 20 to process data traffic associated with the first transmission. The transmitter component 210 can utilize initial parameters for the transmission, such as an MCS or the like, that is based on channel condition information as it is known to the Node B 10 prior to the transmission.

The Node B 10 shown in FIG. 2 further includes a receiver component 220, which can receive a second transmission from the UE 20 via an uplink communication channel (e.g., PUCCH, PUSCH, etc.) in response to the first transmission conducted by the transmitter component 210. The second transmission received by the receiver component 220 can include channel condition data, indicative of a condition of the downlink communication channel over which the transmitter component 210 transmitted the first transmission as described above, as estimated or otherwise observed by the UE 20 based on the DMRS (e.g., as will be described in further detail below with respect to FIG. 3). Additionally, the second transmission as received by the receiver component 220 can include a HARQ indicator, e.g., an ACK/NACK bit or other suitable data, that corresponds to the first transmission.

The Node B 10 shown in FIG. 2 further includes a parameter adjustment component 230 that, based on the channel condition data received by the receiver component, can adjust an MCS and/or other parameters used for subsequent transmissions to the UE 20. By way of example, the parameter adjustment component can determine a modified MCS to be applied to a third transmission to the UE 20 (not shown in FIG. 2) based on channel quality data obtained with the HARQ indicator via the receiver component 220. In an embodiment, the nature of the third transmission referenced above can be determined based on the HARQ indicator received from the UE 20. For instance, the third transmission can be a retransmission of the first transmission, e.g., in the case of a NACK, or a transmission of new data that is distinct from the first transmission, e.g., in the case of an ACK. Techniques that can be utilized by the Node B 10 to schedule the third transmission based on the receiver component 220 receiving an ACK or NACK indicator are described in further detail below with respect to FIGS. 6-7. Additionally, techniques by which the parameter adjustment component can adjust transmission parameters according to DMRS-based feedback are described in further detail below with respect to FIGS. 8-10.

With reference next to FIG. 3, an example implementation of the UE 20 of system 100 is illustrated. The UE 20 shown in FIG. 3 includes a receiver component 310 that can receive a first transmission, e.g., the first transmission conducted by the transmitter component 210 of the Node B 10 as described above, over a downlink communication channel (e.g., PDSCH, etc.). As described above with respect to FIG. 2, the first transmission can include DMRS information corresponding to the UE 20.

The UE 20 shown in FIG. 3 further includes a channel estimation component 320, which can estimate a channel condition or quality associated with the downlink communication channel on which the first transmission was transmitted by the Node B 10 based on the DMRS. The UE 20 shown in FIG. 3 additionally includes a channel reporting component 330 that can transmit a second transmission to the Node B 10, e.g., the second transmission received via the receiver component 220 of the Node B 10 as described above, that includes channel condition data indicative of the channel condition or quality estimated by the channel estimation component 320 based on the DMRS. As additionally shown in FIG. 3, the channel reporting component 330 can combine the channel condition data and HARQ data, e.g., an ACK/NACK bit or other indicator, into the second transmission. In an implementation, the channel reporting component 330 could combine the channel condition data with other types of data to be sent to the Node B 10, such as scheduling request bits or the like, in addition to and/or in place of the HARQ data.

In an implementation, the UE 20, via the receiver component 310, can use the DMRS provided in the first transmission described above to equalize the data symbols carried via the first transmission. Next, the receiver component 310 can attempt decoding the associated message, e.g., a PDSCH message. Subsequently, the channel reporting component 330 can send a decoding result corresponding to the first transmission, including a cyclic redundancy check (CRC) status, via the HARQ (ACK/NACK) bit.

In respective implementations, the HARQ bit can be reported back to the Node B 10 by the channel reporting component 330 through an uplink control channel (e.g., PUCCH) or an uplink data channel (e.g., PUSCH) based on scheduling information provided by the Node B 10 and/or other configuration parameters. As described above with respect to FIG. 2, the parameter adjustment component 230 of the Node B 10 can use the HARQ bit to determine whether to start a new transmission or retransmit the same data. Since comparatively more resources are utilized in a retransmission, retransmissions can result in a lower overall data rate. In order to achieve a target downlink block error rate, the parameter adjustment component 230 can select the transmission parameters, such as MCS, resource block allocation, or the like, based on the channel condition of the UE 20 as reported by the channel reporting component 330 of the UE 20.

In 5G NR technology, a DMRS for PDSCH is intended for channel estimation at the UE as part of coherent demodulation. After demodulation, the UE can attempt decoding the PDSCH message and subsequently send the decoding result, which is the CRC status, via the HARQ bit (e.g., ACK/NACK). In conventional 5G networks, the channel condition for the UE is determined by using a special signal called CSI-RS, through which the UE can determine the channel condition by comparing a received CSI-RS to known, predefined CSI-RS patterns. The UE can then report the channel state information back to a gNB via PUCCH or PUSCH. While the periodicity of the CSI-RS can be determined by the gNB as a configurable parameter, the channel condition can change between reports. This, in turn, can cause the receiver of the UE to fail to decode the signal with the determined parameters when the channel conditions deteriorate, resulting in a retransmission.

Various implementations described herein can enable a UE to utilize PDSCH DMRS to compute and report channel state information in addition to, or in place of, CSI-RS based reporting. In existing 5G systems, PDSCH DMRS are not used by the UE to send back channel state information due to several potential drawbacks of the DMRS. For instance, the PDSCH DMRS do not cover the whole bandwidth part and are present only in the resource blocks used for PDSCH transmission. Additionally, the PDSCH DMRS can potentially switch precoding and number of antenna ports with each new transmission, resulting in the UE being unable to average them over time. However, it is recognized that the use of DMRS-based channel estimation as described herein can result in advantages that improve the performance of a communication system as compared to systems that utilize only CSI-RS based reporting. For instance, PDSCH DMRS can be provided significantly closer to the report time, resulting in UE reports being more up to date. Consequently, a more accurate MCS can be selected for subsequent PDSCH scheduled for a given UE. Additionally, PDSCH DMRS have significantly higher frequency domain resolution, which can further enhance the accuracy of an MCS selected for subsequent PDSCH scheduled for a UE. Further, no extra downlink resources are needed to achieve the above advantages, meaning that no downlink data bandwidth is detrimentally affected. Moreover, since the UE already transmits ACK/NACK information over PUCCH/PUSCH data, the UE can combine the channel information on the same resources. Other advantages are also possible.

In some implementations, DMRS-based channel state reporting as described herein can be combined with CSI-RS based reporting to enhance the channel condition information available to a Node B. For instance, periodic or aperiodic reports generated by a UE based on CSI-RS can be used by the Node B to facilitate coarse tuning of transmission parameters for the UE, while reports generated by the UE based on DMRS can facilitate finer tuning of the transmission parameters and/or to facilitate tuning of the transmission parameters at times in which the CSI-RS is not present.

Returning to FIG. 3, the channel reporting component 330 of the UE 20 can be configured (e.g., by the Node B 10 as will be described in further detail below with respect to FIG. 4) to transmit channel condition information with ACK/ NACK and/or other suitable information via an uplink communication channel, which can be an uplink control channel (e.g., PUCCH for 5G NR) or an uplink data channel (e.g., PUSCH for 5G NR). In an implementation in which the channel reporting component 330 is configured by the Node B 10 to report ACK/NACK via an uplink data channel, the channel reporting component 330 can add additional data (e.g., 4 bits for an SNR report, etc.) to an outgoing data payload, such that the UE 20 can combine HARQ and SNR (or other channel condition) data over the payload. It is noted for purposes of this implementation that "combining" information in the data payload merely refers to adding HARQ, SNR, and/or other data as distinct sections or data fields of the data payload, and does not necessarily refer to performing any combination on the data itself.

Alternatively, in an implementation in which the channel reporting component 330 is configured by the Node B 10 to report ACK/NACK via an uplink control channel, the additional bits associated with the channel condition report can be accommodated to a control channel transmission based on a format of the control channel. For instance, the channel reporting component 330 can represent the channel condition data using a defined number of bits, where the defined number of bits is based on the format of the control channel. By way of a specific example in which the uplink control is PUCCH, PUCCH formats 2, 3, and 4 as defined in the 3GPP 5G NR standard can be utilized to accommodate additional bits, which can be greater or equal to two bits. For instance, the PUCCH channel can be utilized to fit additional data bits by changing the coding scheme utilized for PUCCH transmission. Other techniques could also be used.

In either the case of transmitting channel condition over an uplink data channel or an uplink control channel, the channel reporting component 330 can accommodate the addition of channel condition data without introducing any additional signaling overhead. Reporting as done in this manner can in some cases use a small and generally negligible portion of the uplink bandwidth, and the Node B 10 can control this amount of used bandwidth via a configurable option.

Figure 4:
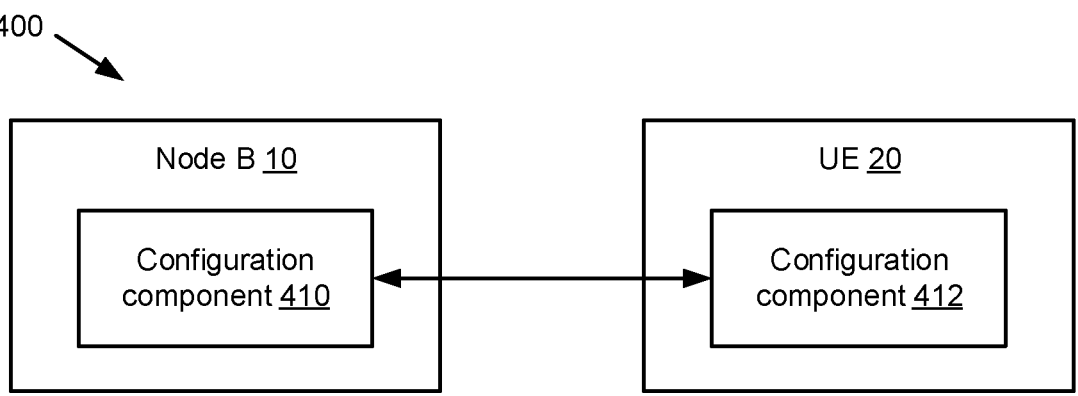
FIG. 4 is a block diagram of a system that facilitates UE configuration for DMRS-based channel estimation in accordance with various implementations described herein.

Referring now to FIG. 4, a block diagram of a system 400 that facilitates UE configuration for DMRS-based channel estimation is illustrated. System 400 as shown in FIG. 4 includes a Node B 10 and a UE 20 that can operate to perform DMRS-based channel estimation and transmission adjustment, e.g., as described above with respect to FIGS. 1-3. As further shown in FIG. 4, the Node B and UE 20 respectively include configuration components 410, 412 that facilitate configuration of the UE 20 for operation as described above. More particularly, the configuration component 410 of the Node B 10 can transmit, prior to an initial transmission as described above with respect to FIG. 1, an instruction to the UE 20 to provide channel condition data with a HARQ indicator or other suitable information, such as scheduling request bits or the like. Subsequently, the configuration component 412 of the UE 20 can receive the instruction from the Node B 10 and, in response to receiving the instruction, can estimate the condition of a downlink communication channel, e.g., a channel over which the instruction was received, based on DMRS signals.

In an implementation, an instruction transmitted via the configuration component 410 of the Node B 10 to either enable or disable DMRS-based channel reporting can be a radio resource control (RRC) message and/or other suitable instruction message. Additionally, the respective configuration components 410, 412 of the Node B 10 and UE 20 can be utilized to enable and/or disable DMRS-based channel reporting based on user or network operator preferences, network conditions or characteristics, or other criteria. For instance, because DMRS-based channel reporting can result in a small amount of transmission and processing overhead at the UE 20, this reporting can be disabled when not needed to reduce the associated overhead.

Figure 5:
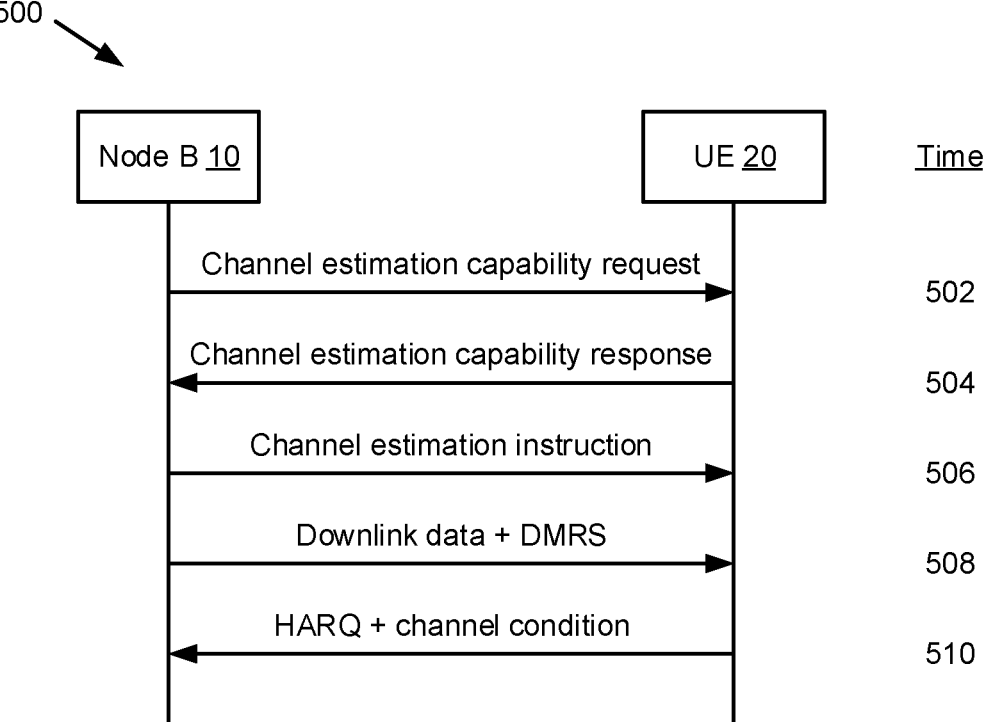
FIGS. 5-7 are messaging flow diagrams depicting various example procedures that can be performed by a Node B and a UE in accordance with various implementations described herein.

In some implementations, configuration of a UE 20 as shown in FIG. 4 can be based on the UE 20 having the ability to perform DMRS-based channel estimation and reporting. Diagram 500 in FIG. 5 illustrates an example messaging flow that can be utilized by the Node B 10 and UE 20 of system 400 to facilitate conditional configuration of the UE 20 for DMRS-based channel reporting. The operations shown in diagram 500 begin at time 502, in which the Node B 10 can provide an RRC message and/or other suitable message to the UE 20 that instructs the UE 20 to declare whether it supports the feature or not.

At time 504, the UE 20 can provide a response to the Node B 10 with the requested information. If the UE 20 does not support the feature, the process shown in diagram 500 can terminate at time 504. Alternatively, the UE 20 can provide an indication to the Node B 10 at time 504 of a capability of the UE 20 to determine channel condition information based on DMRS signals. Subsequently, the Node B 10 can instruct the UE 20 to begin reporting at time 506.

In some implementations, an instruction sent by the Node B 10 at time 506 can include one or more RRC messages that notify the UE 20 to transmit MCS alongside respective HARQ reports according to a reporting frequency, e.g., such that the UE 20 estimates channel condition based on each N-th DMRS and/or provides corresponding CQI information alongside each N-th HARQ report, where N can be any suitable number that is greater than or equal to zero (e.g., 0, 1, 2, 4, 8, 16, etc.). A reporting frequency of zero can be interpreted by the UE 20 as disabling reporting. Also or alternatively, RRC messages provided by the Node B 10 at time 506 can configure the UE 20 to transmit channel condition data alongside the RI at a periodicity M compared to the MCS reports, where M can also be any suitable number greater than or equal to zero. Following the configuration shown at time 506, the Node B 10 can provide downlink data and corresponding DMRS at time 508, and the UE 20 can provide corresponding channel condition data with an HARQ indicator at time 510, as generally described with respect to FIGS. 1-3 above.

Figures 6, 7:
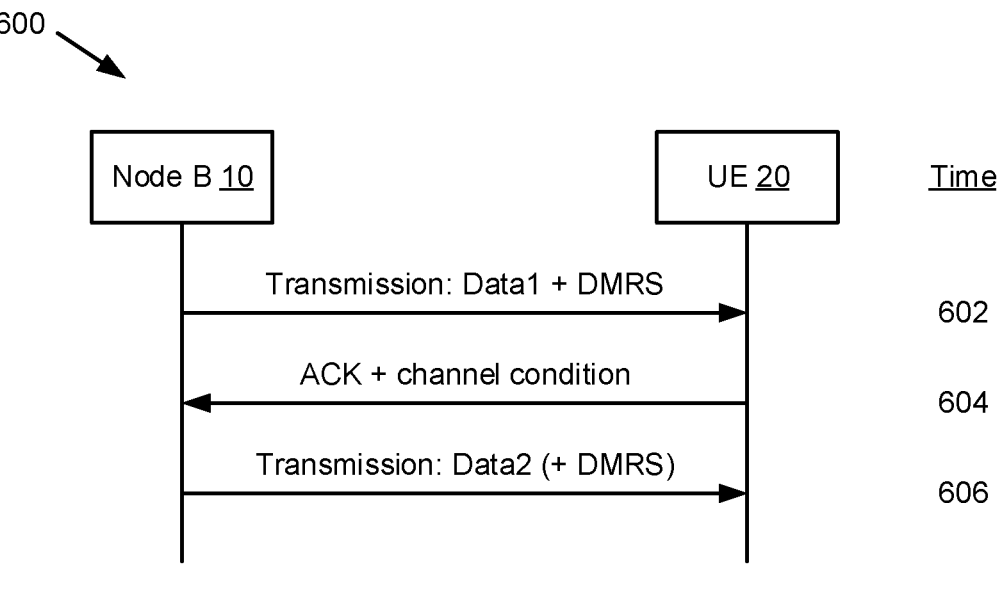

Referring next to FIGS. 6-7, respective messaging flow diagrams that illustrate Node B transmission adjustments based on DMRS-based channel feedback are provided. With reference first to diagram 600 in FIG. 6, the Node B 10 can transmit a first data transmission, with an accompanying DMRS, at time 602. In the example shown in diagram 600, the data transmission passes the CRC at the UE 20. Accordingly, at time 604, the UE 20 can transmit an ACK to the Node B 10 with corresponding channel condition data, e.g., in the four slots following the data transmission at time 602. As a result of the ACK at time 604, the Node B 10 can then initiate a new data transfer to the UE 20 at time 606.

Based on the CQI reported back to the Node B 10 at time 604, the Node B 10 can determine new values for an MCS and/or other properties of the subsequent transmission conducted at time 606. While not shown in diagram 600 for brevity, the UE 20 could again provide CQI to the Node B 10 in response to the second data transmission at time 606. In this way, there can be continuous feedback regarding the channel condition back to the Node B 10 from the UE 20, e.g., until the next occurrence of a CSI-RS report. This can be effectively utilized to dynamically adjust the MCS, RI, and/or other properties used for data transmission without using additional downlink resources for estimation purposes. Since the MCS is adjusted according to the channel condition, the probability of the receiver to decode the data can be increased, resulting in fewer retransmissions and improved system throughput. Additionally, the DMRS-based feedback provided by the UE 20 can be used to estimate the channel on a slot level instead of periodic measurement. Although periodic measurements are performed on the full bandwidth, the additional CQI estimates on scheduled downlink resource blocks can aid in reusing the resource blocks with higher MCS on subsequent transmissions to further increase overall throughput.

Referring now to diagram 700 in FIG. 7, the Node B 10 can transmit a first data transmission to the UE 20 with an accompanying DMRS at time 702, e.g., in a similar manner to the transmission described above at time 602. In contrast to diagram 600, a CRC failure results in the UE 20 sending a NACK to the Node B 10 at time 704 along with channel condition information. This information can be used by the Node B 10 to determine the possible cause(s) for the failure to decode the data in the first attempt in order to facilitate an adjusted retransmission of the data at time 706. When the initial CQI used by the Node B 10 for the transmission at time 702 differs from the CQI reported at time 704, the Node B 10 can perform adjustments based on the extent of the deviation. In general, the deviation can be treated in three states, e.g., low, medium, and high deviation, and can be processed as described below with respect to FIGS. 8-9.

Figure 8:
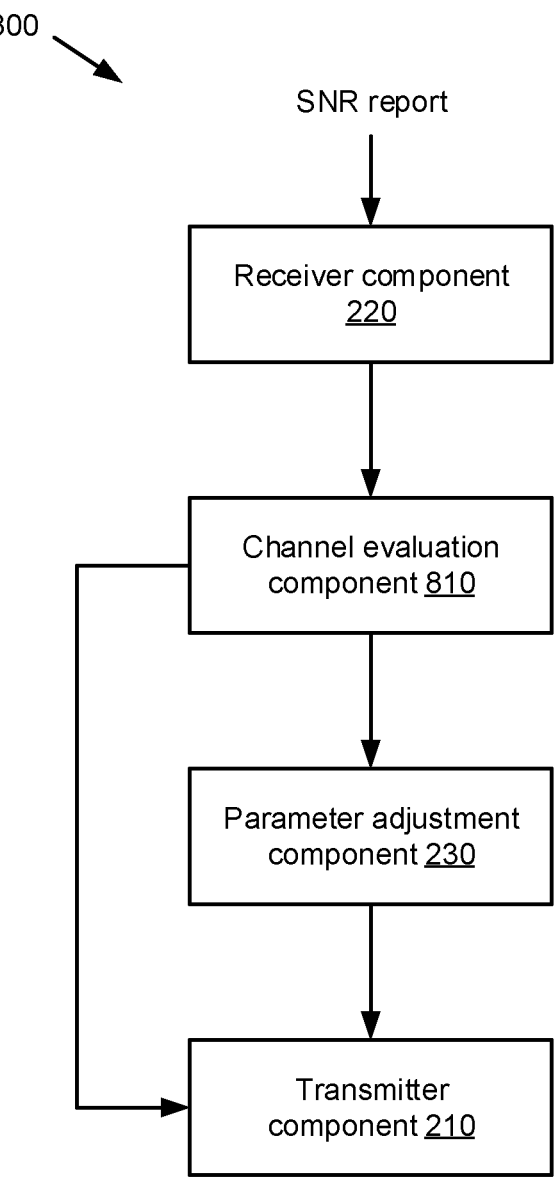
FIG. 8 is a block diagram of a system that facilitates transmission adjustment according to DMRS-based feedback in accordance with various implementations described herein.

Turning to FIG. 8, a block diagram of a system 800 that facilitates transmission adjustment according to DMRS-based feedback is illustrated. In an implementation, some or all of system 800 can be implemented by the Node B 10 as described above, or other suitable devices, to adjust parameters for a retransmission (e.g., in response to receiving a NACK with channel state feedback). As shown in FIG. 8, in the event that the receiver component 220 receives a CRC failure report (e.g., a NACK) from a UE 20, system 800 can, via a channel evaluation component 810, compare a channel condition metric received with the NACK to a channel condition metric that was used to conduct the transmission for which the NACK was received. Based on an amount of deviation in these metrics as determined by the channel evaluation component, system 800 can take respective further actions. For purposes of description, three states are described, e.g., for low, medium, and high deviation.

In the case of low deviation, e.g., where the deviation is less than a first threshold amount, the transmitter component 210 can continue the retransmission without changing the parameters, since the RV index is changed which results in more repetition available for the UE to perform HARQ combining to make the decoding successful.

In the case of medium deviation, e.g., where the deviation is greater than the first threshold amount but lower than a second, higher threshold amount, the parameter adjustment component 230 can facilitate performance of the retransmission with lesser MCS compared to the original transmission, as well as adding more resource elements to the retransmission, to maintain the transport block size the same as the first transmission and increase the chance of CRC success.

In the case of high deviation, e.g., where the deviation is greater than the second threshold amount, there may not be enough resources available to accommodate a sufficiently low MCS to support retransmission. Accordingly, as further shown by system 900 in FIG. 9, the channel evaluation component 810 can trigger operation of a scheduling component 910 that can assign the retransmission to different time-frequency resources than those used in the original transmission, e.g., in order to avoid underutilizing the available resources. For instance, the scheduling component 910 can either drop the HARQ retransmission, enabling higher layer triggering of the transmission again with different physical resources, or continue the retransmission with different resource elements in the frequency domain.

Figure 9:
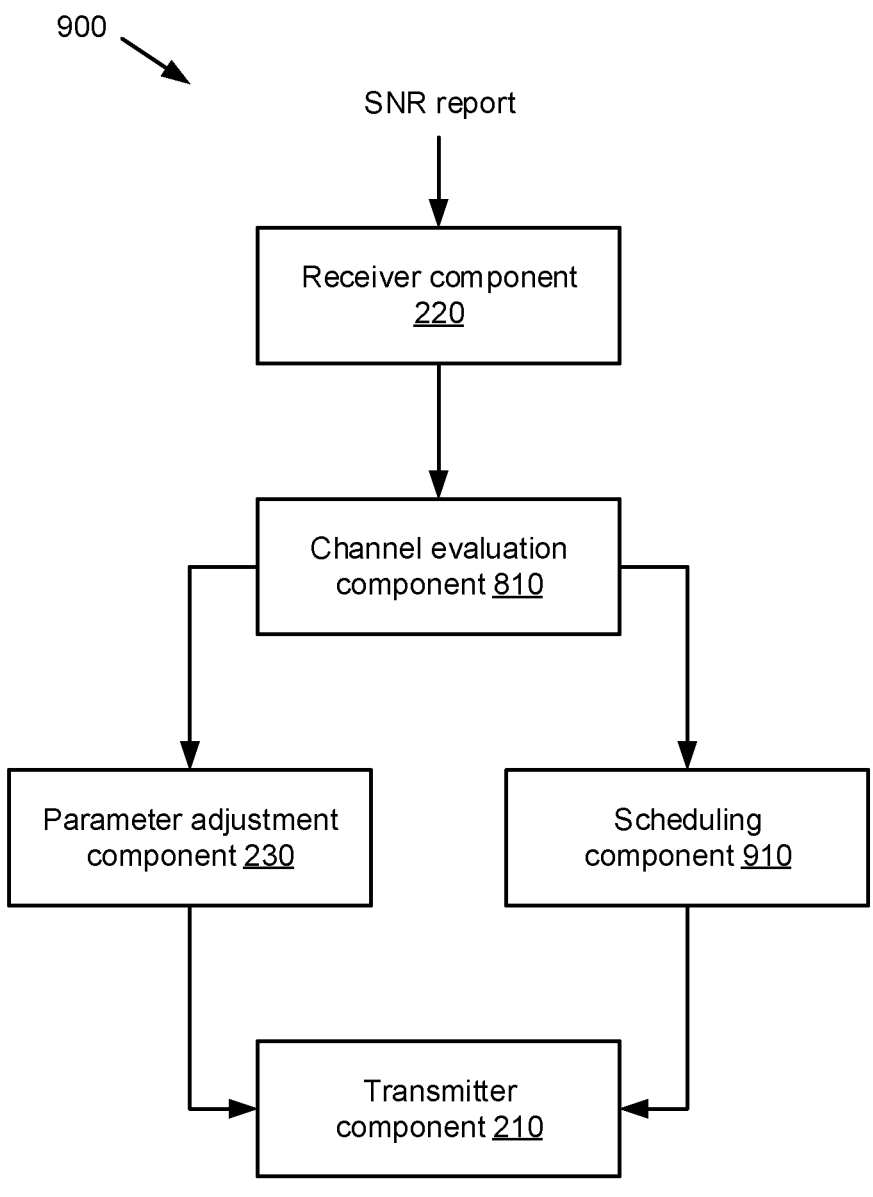
FIG. 9 is a block diagram of a system that facilitates transmission adjustment and/or scheduling according to DMRS-based feedback in accordance with various implementations described herein.
Figure 10:
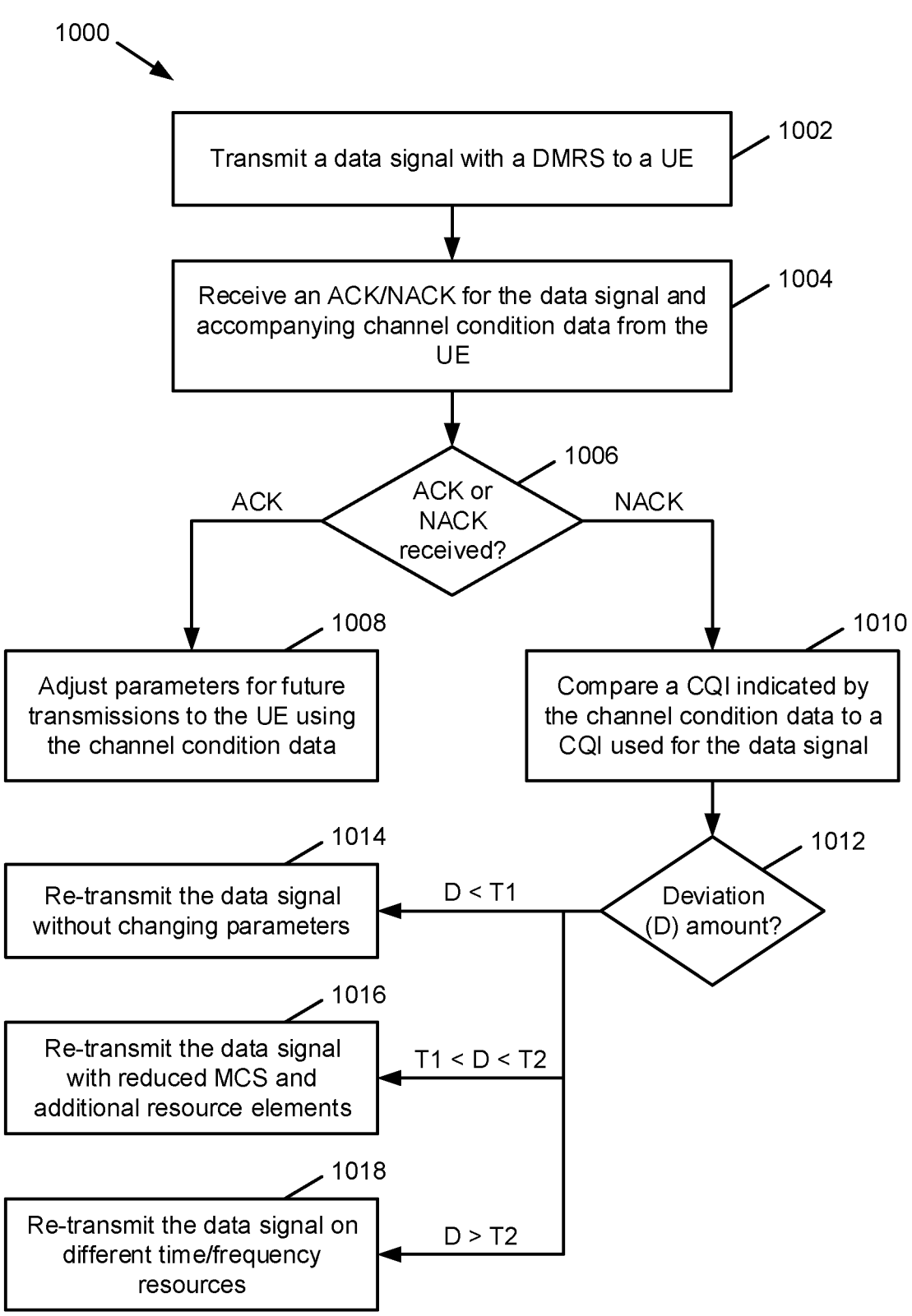
FIG. 10 is a flow diagram of an example method that can be performed by the systems of FIG. 8 and/or FIG. 9 in accordance with various implementations described herein.

With reference now to FIG. 10, and with further reference to FIGS. 8-9, a flow diagram of an example method 1000 that can be performed by system 800 and/or system 900 is illustrated. At 1002, a data signal can be transmitted (e.g., by a Node B 10) with a DMRS to a UE (e.g., a UE 20). At 1004, an ACK/NACK for the data signal transmitted at 1002 can be received from the UE along with accompanying channel condition data.

At 1006, method 1000 can branch based on whether an ACK or a NACK was received at 1004. If an ACK is received, method 1000 can conclude at 1008, in which parameters for future transmissions to the UE are adjusted (e.g., by a parameter adjustment component 230) using the channel condition data received at 1004.

If, instead, a NACK is received at 1004, method 1000 can proceed from 1006 to 1010, in which a CQI indicated via the channel condition data is compared (e.g., by a channel evaluation component 810) to a CQI used for the data signal transmitted at 1002. Based on an amount of deviation D between these CQIs, method 1000 branches at 1012.

If the amount of deviation D is determined at 1012 to be less than a first threshold T1, method 1000 concludes at 1014, in which the data signal is retransmitted (e.g., via a transmitter component 210) without changing the parameters used for the initial transmission.

If the amount of deviation D is determined at 1012 to be between threshold T1 and a higher threshold T2, method 1000 can conclude at 1016, in which the data signal is retransmitted with a reduced MCS (e.g., as determined by a parameter adjustment component 230) and additional resource elements.

Alternatively, if the amount of deviation D is determined at 1012 to be greater than threshold T2, method 1000 can instead conclude at 1018, in which the data signal is retransmitted on different time-frequency resources (e.g., as determined via a scheduling component 910).

With respect to method 1000, it is noted that in the event that the amount of deviation D is equal to thresholds T1 or T2, a suitable action can be selected from those listed at 1014, 1016, and 1018 based on any suitable criteria. For instance, for a case where D=T1, method 1000 can branch from 1012 to either 1014 or 1016. Additionally, for a case where D=T2, method 1000 can branch from 1012 to either 1016 or 1018.

Referring next to FIG. 11, a flow diagram of a method 1100 that facilitates DMRS-based channel estimation is illustrated. At 1102, a device (e.g., a UE 20) can receive (e.g., by a receiver component 310) a first transmission that is transmitted to the device by network equipment (e.g., a Node B 10) via a downlink communication channel, where the first transmission includes, or is associated with, a DMRS.

At 1104, the device can estimate (e.g., by a channel estimation component 320) a channel quality associated with the downlink channel based on the DMRS received at 1102.

At 1106, the device can transmit (e.g., by a channel reporting component 330) a second transmission to the network equipment from which the first transmission was received at 1102. The second transmission can include channel quality data indicative of the channel quality estimated at 1004 and HARQ data corresponding to the first transmission.

Turning to FIG. 12, a flow diagram of a method that facilitates DMRS-based MCS determination in downlink allocation is illustrated. At 1202, a first device (e.g., a Node B 10) comprising a processor can transmit (e.g., by a transmitter component 210) a first transmission to a second device (e.g., a UE 20) via a downlink channel. The first transmission conducted at 1202 can utilize a first MCS and include a DMRS.

At 1204, the first device can receive (e.g., by a receiver component 220) a second transmission from the second device in response to the first transmission conducted at 1202. The second transmission received at 1204 can include channel quality data, indicative of a quality of the downlink channel used at 1202 as estimated by the second device based on the DMRS, as well as HARQ data corresponding to the first transmission.

At 1206, the first device can adjust (e.g., by a parameter adjustment component 230) the first MCS based on the channel quality data received at 1204, resulting in a second MCS to be applied to a third transmission to the second device.

FIGS. 10-12 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 13:
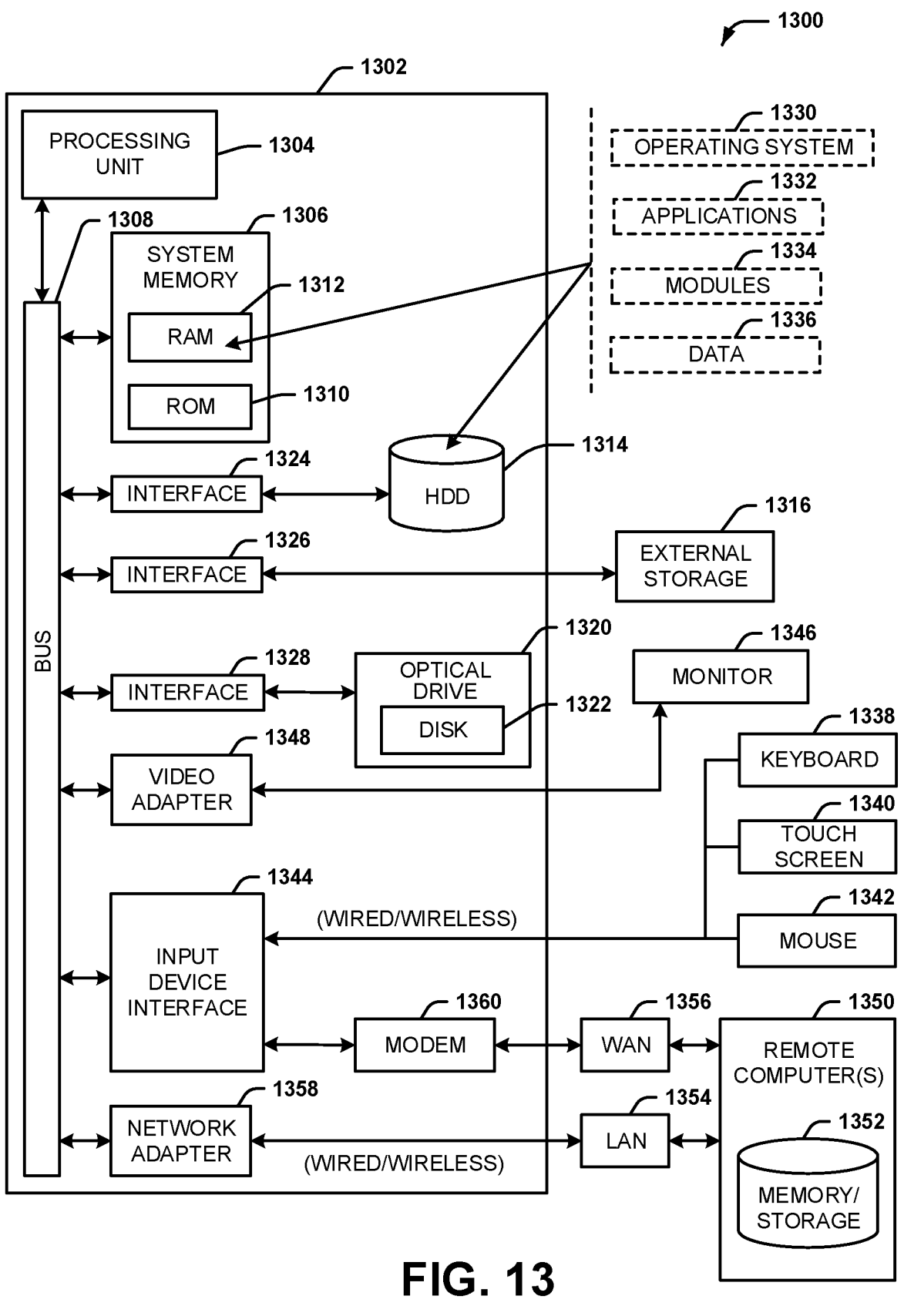
FIG. 13 is a diagram of an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD), a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1313. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A user equipment, comprising:
a memory that stores executable components; and
a processor that executes the executable components stored in the memory, wherein the executable components comprise:
   a receiver component that receives a first transmission, transmitted by network equipment to the user equipment via a downlink communication channel and using downlink resource blocks scheduled for the first transmission, the first transmission comprising a demodulation reference signal (DMRS), wherein the downlink resource blocks comprise less than a full bandwidth part associated with the user equipment;
   a channel estimation component that estimates a first condition of the downlink communication channel using the downlink resource blocks and based on the DMRS, resulting in a first estimated channel condition; and
   a channel reporting component that transmits a second transmission to the network equipment via an uplink communication channel, the second transmission comprising first channel condition data indicative of the first estimated channel condition and a hybrid automatic repeat request (HARQ) indicator corresponding to the first transmission,
   wherein the receiver component further receives a third transmission from the network equipment via the downlink communication channel, the third transmission comprising a channel state information reference signal (CSI-RS) and occupying the full bandwidth part associated with the user equipment,
   wherein the channel estimation component further estimates a second condition of the downlink communication channel over the full bandwidth part associated with the user equipment based on the CSI-RS, resulting in a second estimated channel condition, and
   wherein the transmitter component further transmits a fourth transmission to the network equipment, the fourth transmission comprising second channel condition data indicative of the second estimated channel condition.

2. The user equipment of claim 1, wherein the uplink communication channel is an uplink data channel, and wherein the second transmission further comprises a data payload directed to the network equipment.

3. The user equipment of claim 1, wherein the uplink communication channel is an uplink control channel, wherein the first channel condition data is represented using a defined number of bits, and wherein the defined number of bits is defined by a format of the uplink control channel.

4. The user equipment of claim 1, wherein the executable components further comprise:

a configuration component that receives, from the network equipment, an instruction to provide the first channel condition data, wherein the channel estimation component estimates the first condition of the downlink communication channel based on the DMRS in response to the configuration component receiving the instruction.

5. The user equipment of claim 4, wherein the configuration component transmits, to the network equipment, an indication of a capability of the user equipment to estimate the first condition of the downlink communication channel based on the DMRS, and wherein the configuration component receives the instruction in response to transmitting of the indication.

6. The user equipment of claim 4, wherein the instruction comprises a reporting frequency, wherein the channel estimation component estimates the first condition of the downlink communication channel based on DMRSs, comprising the DMRS, as provided in first transmissions, comprising the first transmission and selected from transmissions from the network equipment to the user equipment according to the reporting frequency, and wherein the channel reporting component transmits the first channel condition data to the network equipment via second transmissions, comprising the second transmission, to the network equipment.

7. The user equipment of claim 6, wherein the channel estimation component estimates the first condition of the downlink communication channel based on each N-th DMRS of the DMRSs provided in the first transmissions, and wherein N is a number greater than zero and defined based on the reporting frequency.

8. The user equipment of claim 1, wherein the HARQ indicator is an acknowledgement, wherein the receiver component further receives a fifth transmission from the network equipment in response to the network equipment receiving the acknowledgement, and wherein the fifth transmission is adjusted relative to the first transmission based on the channel condition data.

9. The user equipment of claim 1, wherein the HARQ indicator is a negative acknowledgement, wherein the receiver component further receives a re-transmission of the first transmission from the network equipment in response to the network equipment receiving the negative acknowledgement, and wherein the re-transmission is adjusted relative to the first transmission based on the first channel condition data.

10. The user equipment of claim 1, wherein:

the receiver component receives third transmissions, comprising the third transmission, from the network equipment at intervals of a period; and the channel estimation component estimates first conditions of the downlink communication channel, comprising the first condition, in response to the receiver component receiving first transmissions, comprising the first transmission, in which the CSI-RS is not present.

11. A method, comprising:

receiving, by a device comprising a processor, a first transmission that is transmitted to the device by network equipment via a downlink channel and using downlink resource blocks scheduled for the first transmission, wherein the first transmission comprises a demodulation reference signal (DMRS), and wherein the downlink resource blocks comprise less than a full bandwidth part associated with the device;

estimating, by the device, a first channel quality associated with the downlink channel based on the DMRS and using the downlink resource blocks, resulting in a first estimated channel quality;

transmitting, by the device to the network equipment via an uplink channel, a second transmission, the second transmission comprising first channel quality data indicative of the first estimated channel quality and hybrid automatic repeat request data corresponding to the first transmission;

receiving, by the device, a third transmission from the network equipment via the downlink channel, the third transmission comprising a channel state information reference signal (CSI-RS) and occupying the full bandwidth part associated with the device;

estimating, by the device, a second channel quality associated with the downlink channel over the full bandwidth part associated with the device based on the CSI-RS, resulting in a second estimated channel quality; and transmitting, by the device, a fourth transmission to the network equipment, the fourth transmission comprising second channel quality data indicative of the second estimated channel quality.

12. The method of claim 11, wherein the uplink channel is an uplink data channel, and wherein the second transmission further comprises a data payload directed to the network equipment.

13. The method of claim 11, wherein the uplink channel is an uplink control channel, and wherein the first channel quality data comprises a number of data bits, the number of data bits being defined based on a format of the uplink control channel.

14. The method of claim 11, further comprising:

receiving, by the device from the network equipment, a configuration message instructing the device to provide the first channel quality data, wherein the estimating of the first channel quality is in response to the receiving of the configuration message.

15. The method of claim 14, further comprising:

transmitting, by the device to the network equipment, an indication of a capability of the device to estimate the first channel quality associated with the downlink channel based on the DMRS, wherein the receiving of the request is in response to the transmitting of the indication.

16. A non-transitory machine-readable medium comprising computer executable instructions that, when executed by a processor of a mobile device, facilitate performance of operations, the operations comprising:

receiving a first transmission from a Node B via a physical downlink shared channel using downlink resource blocks scheduled for the first transmission, the first transmission comprising a demodulation reference signal (DMRS), wherein the downlink resource blocks comprise less than a full bandwidth part associated with the mobile device;

estimating a first channel condition associated with the physical downlink shared channel based on the DMRS and using the downlink resource blocks, resulting in a first estimated channel condition;

transmitting, to the Node B via a physical uplink channel, a second transmission, wherein the second transmission comprises first channel condition data associated with the first estimated channel condition and an acknowledgement/negative acknowledgement indicator corresponding to the first transmission;

receiving a third transmission from the Node B via the physical downlink shared channel, the third transmission comprising a channel state information reference signal (CSI-RS) and occupying the full bandwidth part associated with the mobile device;

estimating a second channel condition associated with the physical downlink shared channel over the full bandwidth part associated with the mobile device based on the CSI-RS, resulting in a second estimated channel condition; and transmitting a fourth transmission to the Node B, the fourth transmission comprising second channel condition data indicative of the second estimated channel condition.

17. The non-transitory machine-readable medium of claim 16, wherein the physical uplink channel is a physical uplink shared channel, and wherein the second transmission further comprises a data payload.

18. The non-transitory machine-readable medium of claim 16, wherein the physical uplink channel is a physical uplink control channel, and wherein the operations further comprise:

embedding the first channel condition data into a data field of the second transmission, the data field being of a size that is defined based on a format of the physical uplink control channel.

19. The non-transitory machine-readable medium of claim 16, wherein the operations further comprise:

receiving a configuration message from the Node B instructing the mobile device to provide the first channel condition data, wherein the estimating of the first channel condition is in response to the receiving of the configuration message.

20. The non-transitory machine-readable medium of claim 19, wherein the configuration message is a first configuration message, and wherein the operations further comprise:

transmitting a second configuration message to the Node B, the second configuration message indicating a capability of the mobile device to estimate the first channel condition associated with the physical downlink shared channel based on the DMRS, wherein the receiving of the first configuration message is in response to the transmitting of the second configuration message.

* * * * *